US011489777B1

(12) United States Patent
Imaev

(10) Patent No.: US 11,489,777 B1
(45) Date of Patent: Nov. 1, 2022

(54) NETWORK OPTIMIZATION AND STATE SYNCHRONIZATION

(71) Applicant: Denis Imaev, Brooklyn, NY (US)

(72) Inventor: Denis Imaev, Brooklyn, NY (US)

(73) Assignee: CFPH, LLC, New York, NY (US)

( * ) Notice: Subject to any disclaimer, the term of this patent is extended or adjusted under 35 U.S.C. 154(b) by 74 days.

(21) Appl. No.: 16/987,959

(22) Filed: Aug. 7, 2020

Related U.S. Application Data

(60) Provisional application No. 62/884,905, filed on Aug. 9, 2019.

(51) Int. Cl.
H04L 43/028 (2022.01)
H04L 47/22 (2022.01)
H04L 45/302 (2022.01)
H04L 47/70 (2022.01)
G06Q 40/04 (2012.01)
H04L 47/33 (2022.01)

(52) U.S. Cl.
CPC ............. *H04L 47/22* (2013.01); *G06Q 40/04* (2013.01); *H04L 45/3065* (2013.01); *H04L 47/33* (2013.01); *H04L 47/827* (2013.01)

(58) Field of Classification Search
CPC . H04L 63/18; H04L 63/0861; H04L 63/0236; H04L 63/101; H04L 63/061; H04L 63/306; H04L 12/1886; H04L 63/105; H04L 29/06; H04L 12/18; H04L 12/56; H04L 12/851; H04L 121/26; H04L 43/0894; H04L 47/2441; H04L 47/2475; H04L 43/028; H04L 63/0281; H04L 63/0428; G06F 16/9024; G06F 16/901; G06F 15/173; G06F 17/60; G06M 20/00; G06N 20/00; G06N 3/04; G06N 3/08; G06Q 40/00
USPC ........................................................ 370/235
See application file for complete search history.

(56) References Cited

U.S. PATENT DOCUMENTS

| | | | | |
|---|---|---|---|---|
| 6,983,259 B1 * | 1/2006 | Foray | ..................... | G06Q 40/04 705/37 |
| 7,472,087 B2 * | 12/2008 | Keith | ..................... | G06Q 40/06 705/37 |
| 7,685,048 B1 * | 3/2010 | Hausman | ............... | G06Q 40/04 705/37 |
| 8,543,488 B2 * | 9/2013 | Vinokour | ............... | G06Q 40/04 705/37 |
| 9,071,542 B2 * | 6/2015 | Jackowski | .............. | H04L 69/22 |
| 9,130,864 B2 * | 9/2015 | Keith | ................. | H04L 47/2433 |
| 9,294,378 B2 * | 3/2016 | Jackowski | .......... | H04L 43/0894 |
| 9,736,041 B2 * | 8/2017 | Lumezanu | .............. | H04L 43/20 |
| 10,498,655 B1 * | 12/2019 | Nitzan | ................ | H04L 41/0896 |
| 2005/0283427 A1 * | 12/2005 | Owens | ................... | G06Q 40/04 705/37 |
| 2007/0245010 A1 * | 10/2007 | Arn | ..................... | H04L 67/1023 709/223 |
| 2009/0083422 A1 * | 3/2009 | McKay | .............. | H04L 63/0272 709/225 |
| 2020/0104678 A1 * | 4/2020 | Nixon | .................. | G06N 3/0472 |

\* cited by examiner

*Primary Examiner* — Man U Phan

(57) ABSTRACT

Disclosed herein are an apparatus, non-transitory computer readable medium, and method for minimizing network traffic and maintaining synchronous state information between systems.

14 Claims, 6 Drawing Sheets

NETWORK OPTIMIZATION AND STATE SYNCHRONIZATION

BACKGROUND

Many industries heretofore rely on network performance for meeting the demand of their customers. For example, financial institutions invest heavily in computing and processing power. Today's networking speeds allow thousands of trades to execute in seconds and allow financial institutions to capitalize on trading strategies based on microsecond differentials.

DETAILED DESCRIPTION

Figure 1:
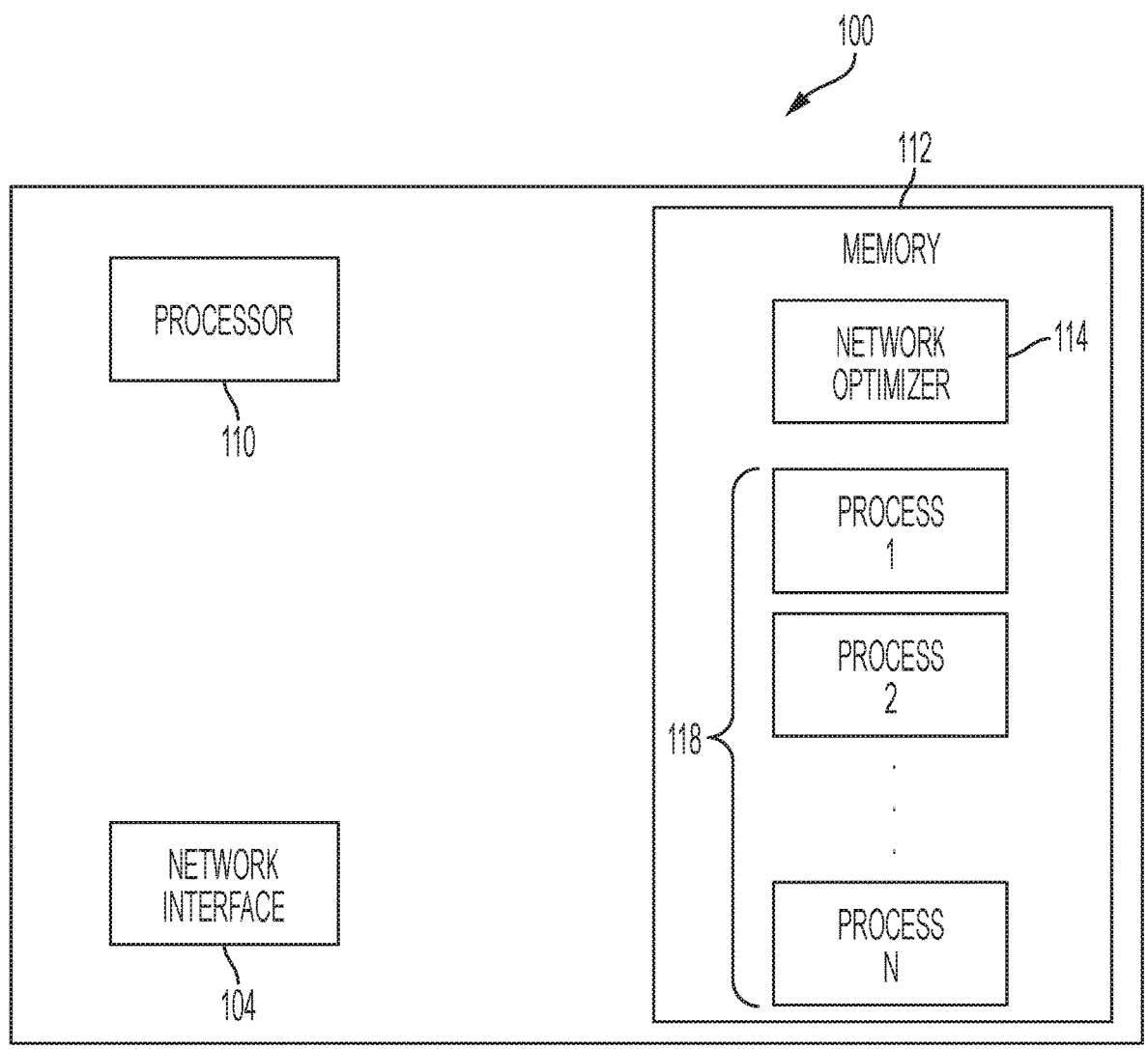
FIG. 1 is an example apparatus in accordance with aspects of the present disclosure.

As noted above, today's networking speeds allow thousands of trades to execute in a matter of seconds. Trading systems may send many electronic messages to an exchange via a network, and the high volume of transmitted messages may cause unwanted network latency. Unfortunately, such latency may incur significant costs due to missed microsecond opportunities. Furthermore, an order amend message may be slow to arrive at an exchange due to poor network performance. As a result, an exchange may reject, fill, or cancel an order before the amend message arrives causing the order state between a trading system and an exchange to be out of synch. Finally, exchanges typically prioritize trading instructions in a queue based on a first come first serve basis. Therefore, network congestion may also cause trading messages to be prioritized lower than messages from other competing systems.

In view of the foregoing, disclosed herein are an apparatus, method, and non-transitory computer readable medium for minimizing network traffic and maintaining synchronicity between a trading system and remote execution venues. The examples discussed below improve the functioning of the computer by increasing network bandwidth and managing the state of the system. It is understood that the example techniques described herein overcome a problem specifically arising in the realm of computer networks because these techniques reduce network congestion and eliminate asynchronous conditions caused by network latency. Furthermore, the operations disclosed herein also balance network performance with exchange execution priority.

In one aspect, an apparatus is disclosed. The apparatus may comprise a memory, a network interface, and at least one processor. At least one processor may be configured to execute the following operations: receive, via the network interface, a request to implement a trading strategy; in response to the request, generate a plurality of trading processes in the memory to implement the strategy and generate one network optimization process in the memory to minimize network traffic caused by the trading processes and to synchronize order state information between the trading processes and a plurality of remote execution venues; and cause the network optimization process to periodically request trading instructions from the trading processes in a specific sequence that is based on a priority of each trading process and determine whether to forward a trading instruction to a remote execution venue or adjust at least one order already acknowledged by an execution venue in lieu of forwarding the trading instruction.

In another example, at least one processor of the apparatus may synchronize the order state information by executing the following operations: cause the network optimization process to forward a new order from a given trading process to a given execution venue; cause the network optimization process to determine whether the given execution venue has acknowledged the new order; and cause the network optimization process to prevent forwarding further trading instructions related to the new order until the given execution venue acknowledges the new order.

In another aspect, at least one processor of the apparatus may minimize network traffic by executing the following operations: cause the network optimization process to receive, from a given trading process, a request for a quantity of a financial instrument, the request may indicate a specific order type; cause the network optimization process to determine whether the given execution venue has already acknowledged one or more orders for the financial instrument whose aggregate quantity equals the quantity of the request; and cause the network optimization process to prevent the new order from being forwarded to the given execution venue, in response to determining that the given execution venue has already acknowledged one or more orders for the financial instrument whose aggregate quantity equals the quantity of the request. The one or more acknowledged orders may originate from one or more trading processes whose priority is higher than that of the given trading process.

In yet another example, at least one processor of the apparatus may minimize network traffic by executing the following operations: cause the network optimization process to receive, from a given trading process, a request for a quantity of a financial instrument, the request may indicate a specific order type; cause the network optimization process to determine whether the given execution venue has already acknowledged one or more orders for the financial instrument whose aggregate quantity is more than the quantity of the request; and cause the network optimization process to adjust at least one of the acknowledged orders for the financial instrument such that the aggregate, acknowledged quantity of the financial instrument equals the quantity of the new order. In another example, the adjustment may include at least one processor causing the network optimization process to cancel an acknowledged order for the financial instrument that originated from a trading process whose priority is lower than all other trading processes whose orders for the financial instrument were acknowledged.

Several trading processes generated by at least one processor may be based on a type of trading strategy. Furthermore, the number of trading processes to generate for a type of trading strategy may be configurable. A method and non-transitory readable medium are also disclosed.

The aspects, features and advantages of the present disclosure will be appreciated when considered with reference to the following description of examples and accompanying figures. The following description does not limit the application; rather, the scope of the disclosure is defined by the appended claims and equivalents.

FIG. 1 presents a schematic diagram of an illustrative computer apparatus 100 for executing the techniques disclosed herein. Computer apparatus 100 may be capable of processing instructions and transmitting data to and from other computers via network interface 104. Computer apparatus 100 may include, but is not limited to, a laptop, a full-sized personal computer, a high-end server, a mobile device, or a tablet computer. Computer apparatus 100 may include input devices, such as a keyboard, mouse, pen-inputs, joysticks, buttons, touch screens, etc., as well as a display, which could include, for instance, a CRT, LCD, plasma screen monitor, TV, projector, etc. Computer apparatus 100 may also utilize network interface 104 to communicate with other devices over a network. Although all the components of computer apparatus 100 are functionally illustrated as being within the same block, it is understood that the components may or may not be stored within the same physical housing.

Computer apparatus 100 may also contain a processor 110. In one example, processor 110 may be an application specific integrated circuit ("ASIC"). Memory 112 may store instructions that may be retrieved and executed by processor 110. As will be discussed in more detail below, the instructions may include a network optimizer 114 and a plurality of processes 118. In one example, memory 112 may be used by or in connection with any instruction execution system that can fetch or obtain the logic from memory 112 and execute the instructions contained therein. While only one processor and one memory are shown in FIG. 1, computer apparatus 100 may comprise additional processors and memories that may or may not be stored within the same physical housing or location.

In another example, the instructions may be stored in a non-transitory computer readable media ("CRM"). A non-transitory CRM may comprise any one of many physical media such as, for example, electronic, magnetic, optical, electromagnetic, or semiconductor media. More specific examples of suitable non-transitory CRM include, but are not limited to, a portable flash drive, portable memory card, a portable read-only memory ("ROM"), an erasable programmable read-only memory, a portable compact disc or other storage devices that may be coupled to computer apparatus 100 directly or indirectly. The non-transitory CRM may also include any combination of one or more of the foregoing and/or other devices as well.

As noted above, computer apparatus 100 may also be interconnected to other computers via a network, which may be a local area network ("LAN"), wide area network ("WAN"), the Internet, etc. The network and intervening nodes may also use various protocols including virtual private networks, local Ethernet networks, private networks using communication protocols proprietary to one or more companies, cellular and wireless networks, HTTP, and various combinations of the foregoing. Although only a few computers are depicted in the working examples herein it should be appreciated that a network may include any number of interconnected computers.

Network optimizer 114 and processes 118 in memory 112 may comprise any set of instructions to be executed directly (such as machine code) or indirectly (such as scripts) by processor 110. In this regard, the terms "instructions," "scripts," or "modules" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

Figure 2:
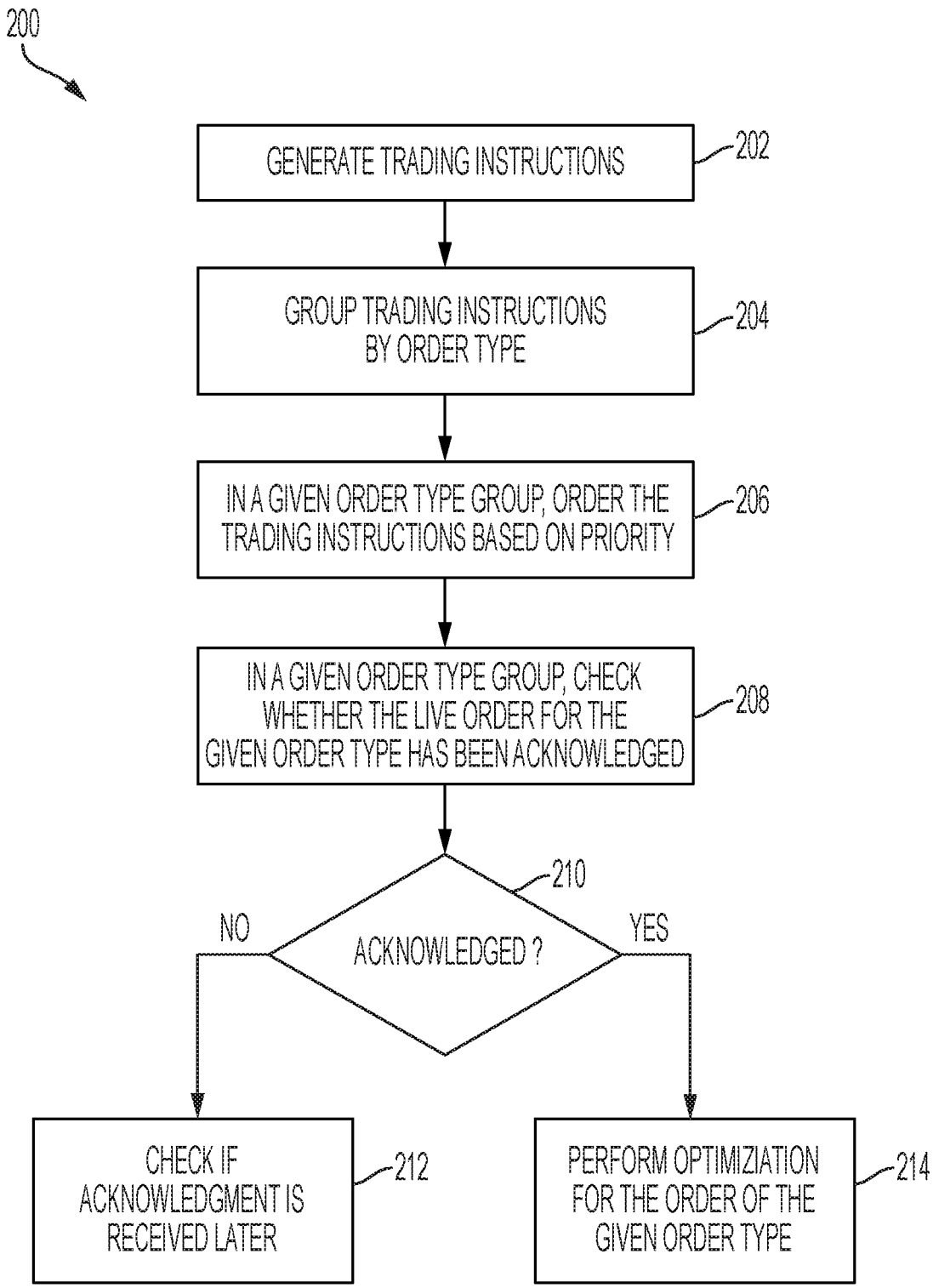
FIG. 2 is a flow diagram of an example method in accordance with aspects of the present disclosure.
Figure 3:
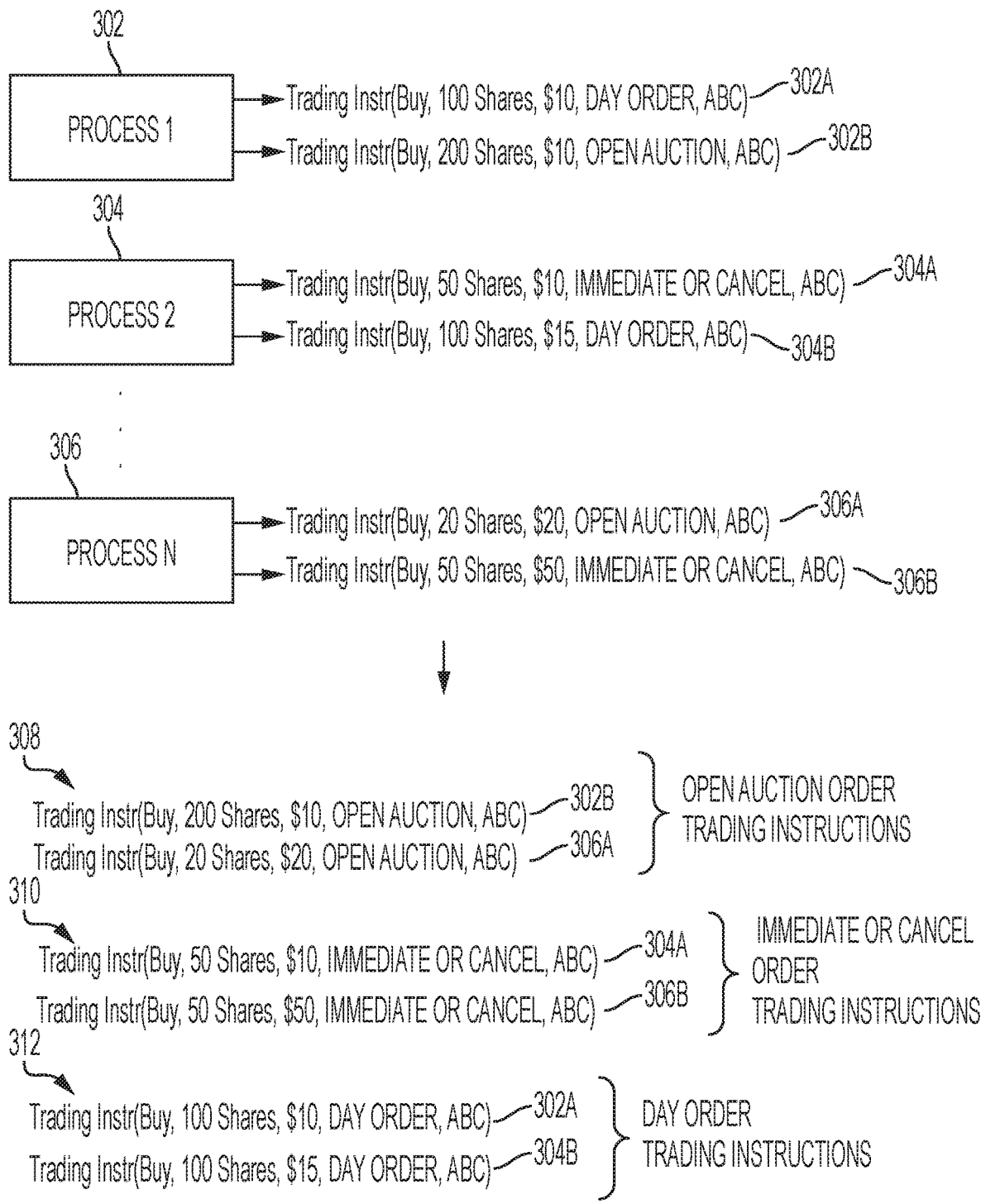
FIG. 3 is a working example in accordance with aspects of the present disclosure.
Figure 4:
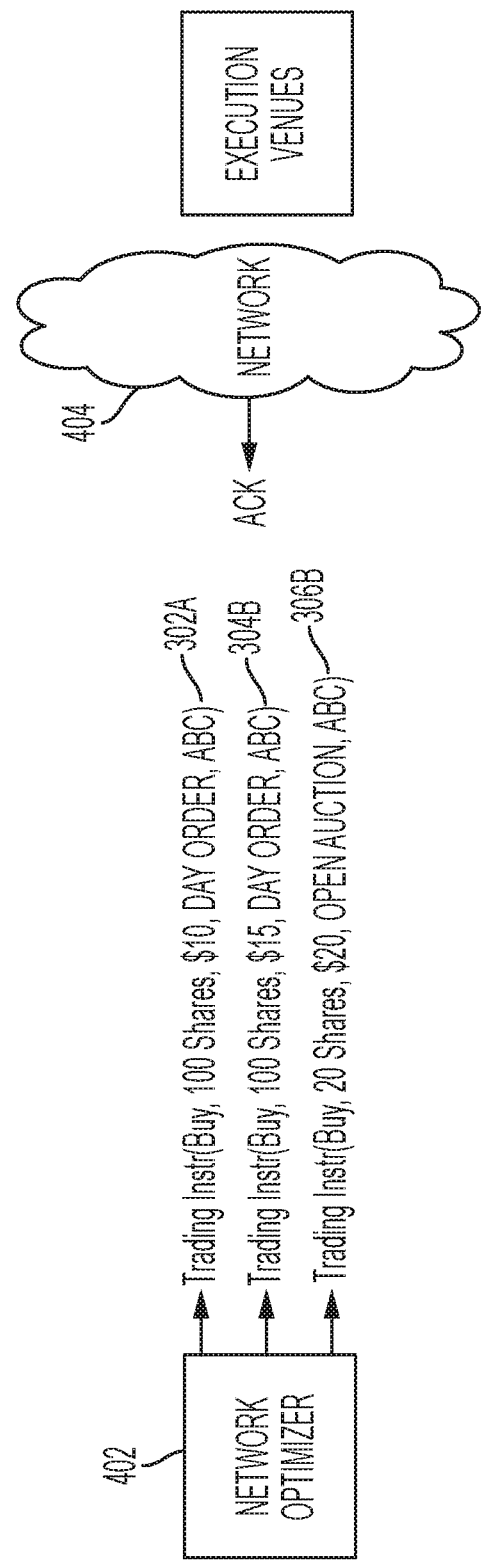
FIG. 4 is a further working example in accordance with aspects of the present disclosure.

One working example of managing order state information is shown in FIGS. 2-4. FIG. 2 illustrates a flow diagram of an example method 200 for managing the synchronization of order states. FIGS. 3-4 illustrate a working example that corresponds to the flow diagram in FIG. 2.

Referring to FIG. 2, trading instructions may be generated, as shown in block 202. Referring now to FIG. 3, processes 302, 304, and 306 are shown (i.e., process 1 thru n). This group of processes may be generated by at least one processor of an apparatus to implement a trading strategy. The number of processes in the group may depend of the trading strategy being applied. Each process in a group may execute independently without knowledge of the other processes in the group. Nevertheless, the processes will ultimately implement a strategy together albeit while executing independently. Each process may generate various trading instructions or requests for a quantity of a financial instrument at a specific price. The request may also indicate an order type. As will be discussed in more detail below, the requests may be reviewed by a network optimizer process before being transmitted to the execution venues. While the figures herein show three processes, it is understood that several more processes may be generated and that three processes are used herein for illustrative purposes only.

Referring to FIG. 2, the trading instructions may be grouped by order type, as shown in block 204. In FIG. 3, process 302 is shown generating trading instructions 302A and 302B, which include a day order type and an open auction order type, respectively. Process 304 is shown generating trading instructions 304A and 304B, which include an immediate or cancel order type and a day order type, respectively. Finally, trading process 306 (i.e. the nth process) is shown generating trading instructions 306A and 306B, which include an open auction order type and an immediate or cancel order type, respectively. In one example, a network optimizer may group these orders by order type. FIG. 3 also depicts the open auction order trading instructions in group 308, the immediate or cancel order instructions in group 310, and the day order trading instructions in group 312.

Referring again to FIG. 2, in each given order type group, the trading instructions may be ordered based on priority, as shown in block 206. As noted above, the priority of a given process may be based on the trading strategy. In the example of FIG. 3, process 302 has the highest priority, process 304 has the second highest priority, and process 306 has the lowest priority. A higher priority process may be matched with a corresponding seller or buyer before a lower priority process. After a higher priority process is matched, any remaining quantity is made available to a lower priority process. If there is no quantity remaining to buy or sell after the higher priority processes have been matched, the trading instructions of the lower priority processes may be ignored or placed in a queue for later processing. In the event there is enough quantity to buy or sell for all the requesting processes, the order type is the next order of priority. In the example of FIG. 3, open auction orders in group 308 would be transmitted first, immediate or cancel order trading instructions in group 310 would be transmitted second, and day order trading instructions in group 312 would be transmitted last. However, it is understood that a different order type priority may be more optimal in a different exchange and that the priority shown in FIG. 3 is merely illustrative.

Referring to FIG. 3, group 308, trading instruction 302B, which originates from process 302, may have a higher matching priority than trading instruction 306A, which originates from process 306. In group 310, trading instruction 304A, which originates from process 304, may have a higher matching priority over trading instruction 306B, which originates from process 306. Finally, in group 312, trading instruction 302A, which originates from process 302, may have a higher matching priority over trading instruction 304B, which originates from trading process 304. Also, while trading instruction 302A and 302B both originate from the same process 302, the priority of trading instruction 302B is higher than that of trading instruction 302A because open auction orders have a higher priority than day orders in this example. The same reasoning applies to trading instructions 306A, 306B, 304A and 304B. Referring now to FIG. 4, network optimizer 402 is shown transmitting trading instructions 302A, 304B, and 306B to execution venues via network 404.

Referring again to FIG. 2, in block 208, for a given order type group, the network optimizer may determine whether an order corresponding to a trading instruction has been acknowledged by the execution venue. If it is determined that the order was not acknowledged, in block 210, the network optimizer may prevent transmission of the trading instruction to the exchange and check if the acknowledgement is received later, in block 212. If it is determined that the order was acknowledged in block 210, the network optimizer may perform its optimization techniques in block 214. These techniques will be described in more detail below. By checking whether the acknowledgement for an order was sent before sending further instructions, the network optimizer maintains order state synchronicity between the execution venues and the trading system. Furthermore, network optimizer may also check to make sure the last trading instruction was acknowledged before sending an additional trading instruction.

Figure 5:
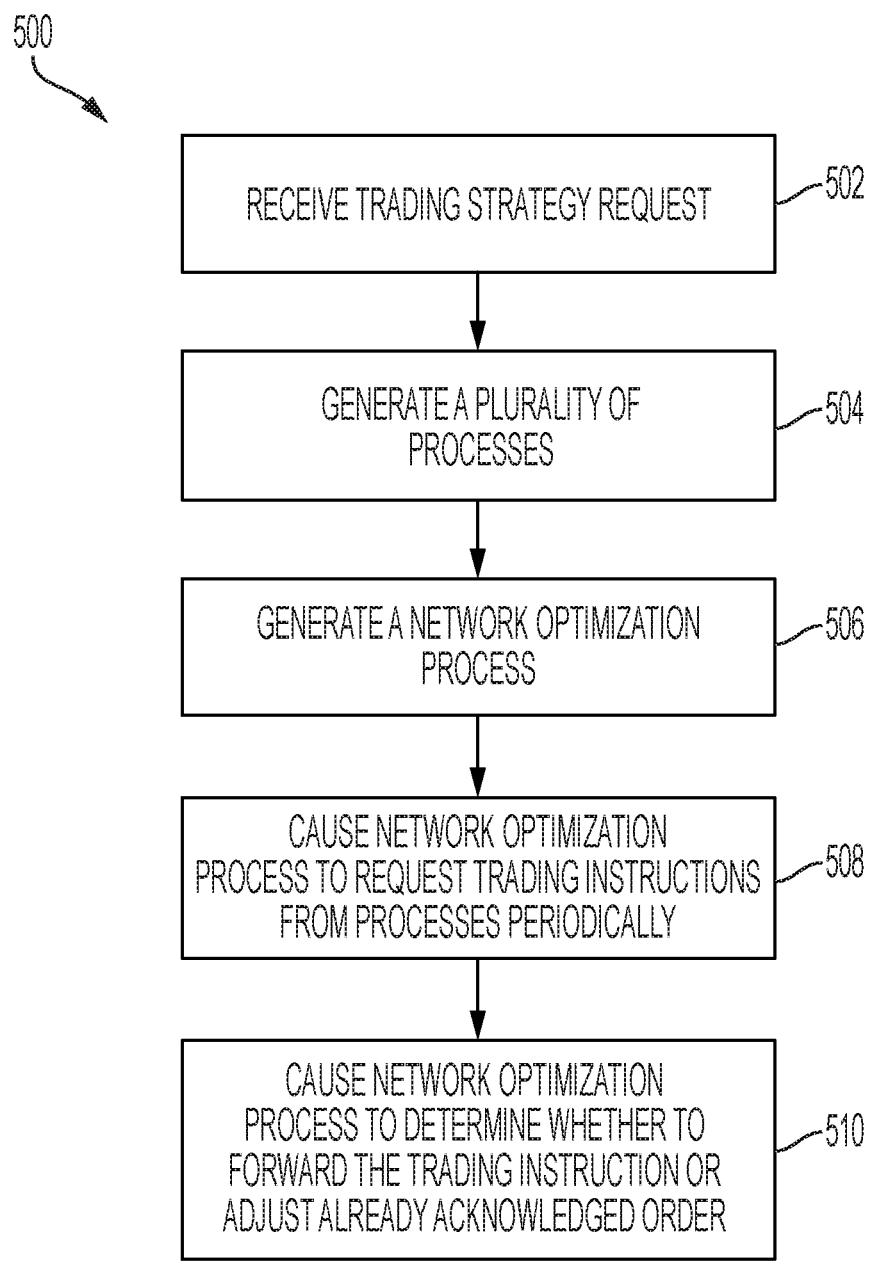
FIG. 5 is a flow diagram of another example method in accordance with aspects of the present disclosure.
Figure 6:
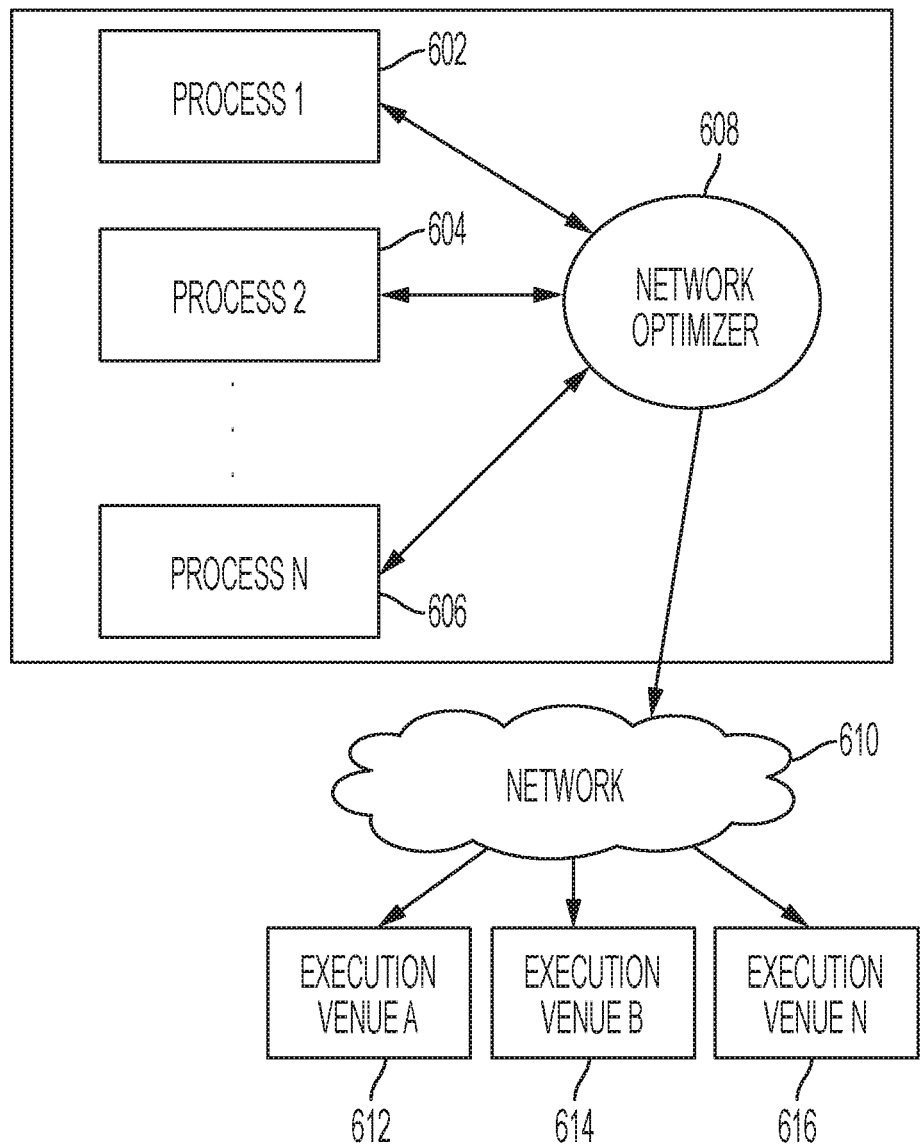
FIG. 6 is yet another working example in accordance with aspects of the present disclosure.

As noted above, the network optimizer may also configure at least one processor to reduce network congestion. A working example of reducing network congestion is shown in FIGS. 5-6. In particular, FIG. 5 is a flow diagram of an example method 500 for network optimization. FIG. 6 shows a working example in accordance with the techniques disclosed herein. The actions shown in FIG. 6 will be discussed below with regard to the flow diagram shown in FIG. 5.

In block 502 of FIG. 5, a trading strategy request may be received. In block 504, a plurality of processes may be generated. The processes may be preconfigured to implement the trading strategy as noted in the previous working example. In block 506, a network optimization process may be generated as also noted in the previous working example. In FIG. 6, processes 602, 604, and 606 are generated to implement a trading strategy. FIG. 6 also shows a network optimizer 608. As noted above, network optimizer 608 may be generated in the memory to minimize network traffic caused by the processes and to synchronize order state information between the trading processes and a plurality of remote execution venues.

In block 508 of FIG. 5, network optimizer 608 may request trading instructions from the processes periodically in a specific order that is based on the priority of each process. The frequency at which network optimizer 608 cycles though processes 602-606 may be configurable. For example, the frequency may be based on a timer. Alternatively, the network optimizer may begin cycling though the processes when a certain order event occurs. In another example, the frequency may be based on a combination of a timer and order events. Referring to FIG. 6, rather than sending trading instructions directly to execution venues 612, 614, and 616, processes 602, 604 and 606 may send their respective quantity and price requests to network optimizer 608 when prompted by the optimizer. In turn, network optimizer 608 determines, in block 510, of FIG. 5, whether to forward the trading instruction to an execution venue via network 610 or adjust one or more orders that were already acknowledged by an execution venue.

Network optimizer 608 may determine that forwarding a message may be redundant because a requested quantity may have already been acknowledged. Furthermore, network optimizer 608 may adjust one or more orders that have already been acknowledged by the exchange in lieu of sending multiple messages. Therefore, the network optimizer reduces the amount of traffic being transmitted over the network. Below are some additional working examples of how the network optimizer may operate.

| Live Orders | New Trading instructions | Example Network optimizer response |
| --- | --- | --- |
| Example 1:<br>O1: 1000 @ 10.00 | 2000 @ 10.00 | place a new order for 1000, so that the total quantity at 10.00 is exactly 2000, but the priority or the first order is preserved |
| Example 2:<br>O1: 1000 @ 10.00 placed at t1<br>O2: 500 @ 9.99 placed t2 | 2000 @ 10.00 | replace O2 with 1000 @ 10.00 |
| Example 3:<br>O1: 1000 @ 10.00 | 500 @ 10.00<br>500 @ 10.00 | Do nothing |
| Example 4:<br>O1: 500 @ 10.00 placed at t1<br>O2: 500 @ 10.00 placed at t2 | 300 @ 10.00 | Cancel O2 and amend O1 quantity down to 300 |
| Example 5:<br>O1: 500 @ 10.00 placed at t1<br>O2: 500 @ 9.99 placed at t2 | 900 @ 10.00 | Replace O2 with 400 @ 10.00. |

In example 1 above, there may be a live acknowledged order for 1000 shares of some instrument at 10.00 per share. Upon receipt, an execution venue may place this order on a queue for execution. At some later time, network optimizer 608 may receive a request from one of the processes that it wants a total of 2000 shares at 10 dollars per share. Although the network optimizer may amend the order by increasing the quantity, doing so would cause the queued order of 1000 shares to lose its priority at the execution venue. An execution venue may place the amended order at the end of the queue because exchanges may not allow you to add quantity without losing priority. This restriction may prevent parties from unfairly testing the market by preserving priority with a lower quantity until new investment related information becomes available. If news favorable to the investment becomes available, it is considered improper to permit an order quantity to be increased while maintaining the priority. In view of this restriction, network optimizer 608 would enter a new order for 1000 shares in this scenario. The new order would be added to the back of the queue but the originally entered 1000 shares maintains its priority. Therefore, as noted above, another advantage of the network optimizer is that it balances network bandwidth efficiency with maintaining queue priority for trading strategy optimization.

In Example 2 above, there may be a live acknowledged order (O1) for 1000 shares of some instrument at $10.00 per share and a second live acknowledged order (O2) for 500 shares of the same instrument for $9.99 per share. Later in time, a process may instruct network optimizer 608 that it would prefer 2000 shares for 10.00 a share. Instead of sending two messages (i.e., a message to cancel O2 and a message to insert a new order for 1000 shares) network optimizer sends one message to replace O2 with 1000 shares at $10.00 a share. Given that the price is being altered, an exchange would place this order to the back of the queue. That is, an exchange may not permit a price change without losing priority. Nevertheless, the priority of O1 is maintained. As such, the network optimizer opts to send one message rather than two messages in this example to reduce network traffic while maintaining the priority of O1.

In Example 3 above, there may be a live acknowledged order for 1000 shares at 10 dollars per share for a given instrument. Subsequently, network optimizer 608 may receive a trading instruction indicating a desire to have two 500 share orders for 10 dollars a share. Here, network optimizer 608 will determine that the aggregate quantity of acknowledged orders (i.e. 1000 shares) equals the quantity of the new request (i.e. 500 shares times 2). Therefore, network optimizer 608 will prevent the transmission of the new orders in this example because doing so would be redundant and creates unnecessary network traffic. The processes may be configured to express the quantity and price of shares they want at any given time without any memory of trading instructions sent in the past. As such, the network optimizer is also configured to keep track of the quantities acknowledged by past requests.

In Example 4 above, there may be two live acknowledged orders: an order (O1) for 500 shares at $10 per share placed at time t1 and a second order (O2) for 500 shares at $10 per share placed later at time t2. In this example, O1 has a higher priority than O2. Subsequently, network optimizer 608 may receive trading instruction indicating a desire to have 300 shares at 10$ per share. In response, the optimizer may cancel O2 and amend O1 down to 300 shares. This action would preserve the priority of O1 because exchanges permit a decrease in order quantity without losing priority. O2 is cancelled here because its priority was lower than O1. Furthermore, network performance is enhanced because only two messages are transmitted (i.e., one cancel and one amend message) instead of three messages (i.e., 2 cancellation messages cancelling O1 and O2 and an order entry message for 300 shares at $10 per share). Thus, network congestion is decreased, and priority is preserved.

Finally, in Example 5, there may be a live acknowledged order (O1) for 500 shares of some instrument at $10.00 per share and a second live acknowledged order (O2) for 500 shares of the same instrument for $9.99 per share. In this example, O2 is also sent later than O1 and O1 has a higher priority in the exchange queue. Subsequently, network optimizer 608 may receive a trading instruction expressing a desire to have 900 shares at 10 per share. In this example, the network optimizer 608 may replace O2 with an order of 400 shares at $10 per share. Given that the price of O2 is being changed, O2 would lose its priority at the exchange, but the priority of 500 shares of O1 is preserved. At the same time, network congestion is reduced because rather than sending three messages (i.e., two messages cancelling O1 and O2 and one order entry message for 900 shares at $10 per share) only one replace message is transmitted.

Advantageously, the above-described apparatus, non-transitory CRM, and method reduce network traffic by minimizing the number of transmitted messages. At the same time, the techniques described herein ensure that the priority of trades is maintained, and the order states are synchronized. Another technical advantage of the system disclosed herein is that the optimization operations are detached from the chain of processes implementing the trading strategy. Thus, as exchange rules and protocols change over time, the network optimizer can be adjusted without disturbing the trading strategy operations configured in the processes. Similarly, as trading strategies change, the processes may be changed without disturbing the optimization commands in the network optimizer.

Although the disclosure herein has been described with reference to examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while processes are shown in a specific order in the appended drawings, such processes are not limited to any order unless such order is expressly set forth herein. Rather, various steps can be handled in a different order or simultaneously, and steps may be omitted or added.

The invention claimed is:

1. An apparatus comprising:
    a memory;
    a network interface; and
    at least one processor to:
        receive, via the network interface, a request to implement a trading strategy;
        in response to the request, generate a plurality of trading processes in the memory to implement the strategy and generate one network optimization process in the memory to minimize network traffic caused by the trading processes and to synchronize order state information between the trading processes and a plurality of remote execution venues; and
        cause the network optimization process to periodically request trading instructions from the trading processes in a specific sequence that is based on a priority of each trading process and determine whether to forward a trading instruction to a remote execution venue or adjust at least one order already acknowledged by an execution venue in lieu of forwarding the trading instruction,
    wherein to synchronize the order state information, the at least one processor is further to:
        cause the network optimization process to forward a new order from a given trading process to a given execution venue;
        cause the network optimization process to determine whether the given execution venue has acknowledged the new order; and
        cause the network optimization process to prevent forwarding further trading instructions related to the new order until the given execution venue acknowledges the new order.

2. The apparatus of claim 1, wherein to minimize network traffic the at least one processor is further to:
    cause the network optimization process to receive, from a given trading process, a request for a quantity of a financial instrument, the request indicating a specific order type;
    cause the network optimization process to determine whether a given execution venue has already acknowledged one or more orders for the financial instrument whose aggregate quantity equals the quantity of the request; and cause the network optimization process to prevent the request from being forwarded to the given execution venue, in response to determining that the given execution venue has already acknowledged one or more orders for the financial instrument whose aggregate quantity equals the quantity of the request.

3. The apparatus of claim 2, wherein the one or more acknowledged orders originated from one or more trading processes whose priority is higher than that of the given trading process.

4. The apparatus of claim 1, wherein to minimize network traffic the at least one processor is further to:
cause the network optimization process to receive, from a given trading process, a request for a quantity of a financial instrument, the request indicating a specific order type;
cause the network optimization process to determine whether a given execution venue has already acknowledged one or more orders for the financial instrument whose aggregate quantity is more than the quantity of the request; and
cause the network optimization process to adjust at least one of the acknowledged orders for the financial instrument such that the aggregate quantity for the financial instrument that has been acknowledged equals the quantity of the request.

5. The apparatus of claim 4, wherein to adjust at least one of the acknowledged orders, the at least one processor is further to cause the network optimization process to cancel an acknowledged order for the financial instrument that originated from a trading process whose priority is lower than all other trading processes whose orders for the financial instrument were acknowledged by the given execution venue.

6. The apparatus of claim 1, wherein a number of trading processes generated by the at least one processor is based on a type of trading strategy.

7. The apparatus of claim 6, wherein the number of trading processes to generate for a type of trading strategy is configurable.

8. A method executed by at least one computer processor, the method comprising:
receiving, via a network interface, a request to implement a trading strategy;
in response to the request, generating a plurality of trading processes in a memory to implement the strategy and generate one network optimization process in the memory to minimize network traffic caused by the trading processes and to synchronize order state information between the trading processes and a plurality of remote execution venues; and
causing the network optimization process to periodically request trading instructions from the trading processes in a specific sequence that is based on a priority of each trading process and determine whether to forward a trading instruction to a remote execution venue or adjust at least one order already acknowledged by an execution venue in lieu of forwarding the trading instruction,
wherein synchronizing the order state information further comprises:

causing the network optimization process to forward a new order from a given trading process to a given execution venue;
causing the network optimization process to determine whether the given execution venue has acknowledged the new order; and
causing the network optimization process to prevent forwarding further trading instructions related to the new order until the given execution venue acknowledges the new order.

9. The method of claim 8, wherein minimizing network traffic further comprises:
causing the network optimization process to receive, from a given trading process, a request for a quantity of a financial instrument, the request indicating a specific order type;
causing the network optimization process to determine whether a given execution venue has already acknowledged one or more orders for the financial instrument whose aggregate quantity equals the quantity of the request; and
causing the network optimization process to prevent the request from being forwarded to the given execution venue, in response to determining that the given execution venue has already acknowledged one or more orders for the financial instrument whose aggregate quantity equals the quantity of the request.

10. The method of claim 9, wherein the one or more acknowledged orders originated from one or more trading processes whose priority is higher than that of the given trading process.

11. The method of claim 8, wherein minimizing network traffic further comprises:
causing the network optimization process to receive, from a given trading process, a request for a quantity of a financial instrument, the request indicating a specific order type;
causing the network optimization process to determine whether a given execution venue has already acknowledged one or more orders for the financial instrument whose aggregate quantity is more than the quantity of the request; and
causing the network optimization process to adjust at least one of the acknowledged orders for the financial instrument such that the aggregate quantity for the financial instrument that has been acknowledged equals the quantity of the request.

12. The method of claim 11, wherein adjusting at least one of the acknowledged orders further comprises causing the network optimization process to cancel an acknowledged order for the financial instrument that originated from a trading process whose priority is lower than all other trading processes whose orders for the financial instrument were acknowledged by the given execution venue.

13. The method of claim 8, wherein a number of generated trading processes is based on a type of trading strategy.

14. The method of claim 8, wherein a number of trading processes to generate for a type of trading strategy is configurable.

* * * * *